United States Patent [19]
Alfano et al.

[11] Patent Number: 6,094,423
[45] Date of Patent: Jul. 25, 2000

[54] WIRELESS PROTOCOL METHOD AND APPARATUS SUPPORTING TRANSACTION REQUESTS WITH VARIABLE LENGTH RESPONSES

[75] Inventors: Nicholas P. Alfano, Vancouver, Canada; Kevin R. Wagner, Fort Worth, Tex.; Steve Upp, Bartlett, Ill.; Jyh-Han Lin, Coral Springs, Fla.; Sreedhar Sivakumaran, Urbana, Ill.

[73] Assignee: Motorola, Inc., Schaumburg, Ill.

[21] Appl. No.: 09/128,584

[22] Filed: Aug. 3, 1998

[51] Int. Cl.[7] ........................................ H04B 7/00
[52] U.S. Cl. ........................ 370/310; 370/465; 370/474
[58] Field of Search .................... 370/310, 464, 370/465, 466, 467, 469, 474, 338; 395/831; 455/422, 426, 450, 507, 517, 524, 560, 100, 113–115, 117

[56] References Cited

U.S. PATENT DOCUMENTS

| | | | |
|---|---|---|---|
| 5,425,023 | 6/1995 | Haraguchi et al. | 370/465 |
| 5,577,172 | 11/1996 | Vatland et al. | 395/114 |
| 5,586,117 | 12/1996 | Edem et al. | 370/466 |
| 5,638,365 | 6/1997 | Duault et al. | 370/395 |
| 5,841,764 | 11/1998 | Roderique et al. | 370/310 |
| 5,852,718 | 12/1998 | Van Loo | 395/200.38 |
| 5,892,753 | 4/1999 | Badt et al. | 370/233 |

*Primary Examiner*—Ajit Patel
*Attorney, Agent, or Firm*—Pablo Meles

[57] ABSTRACT

A method of wireless communication using a hybrid of a transaction protocol and a connection oriented protocol includes the steps of initiating a wireless request from a portable subscriber to a server using the transaction protocol (106) and continuing communications using the transaction protocol (110) if a response from the server is less than a maximum transfer unit size. If the response from the server is greater than a maximum transfer unit size, then the server segments the response into data packets, wherein the portable subscriber unit and server subsequently communicate using the connection oriented protocol (114) until a subsequent wireless request is made from the portable subscriber.

18 Claims, 4 Drawing Sheets

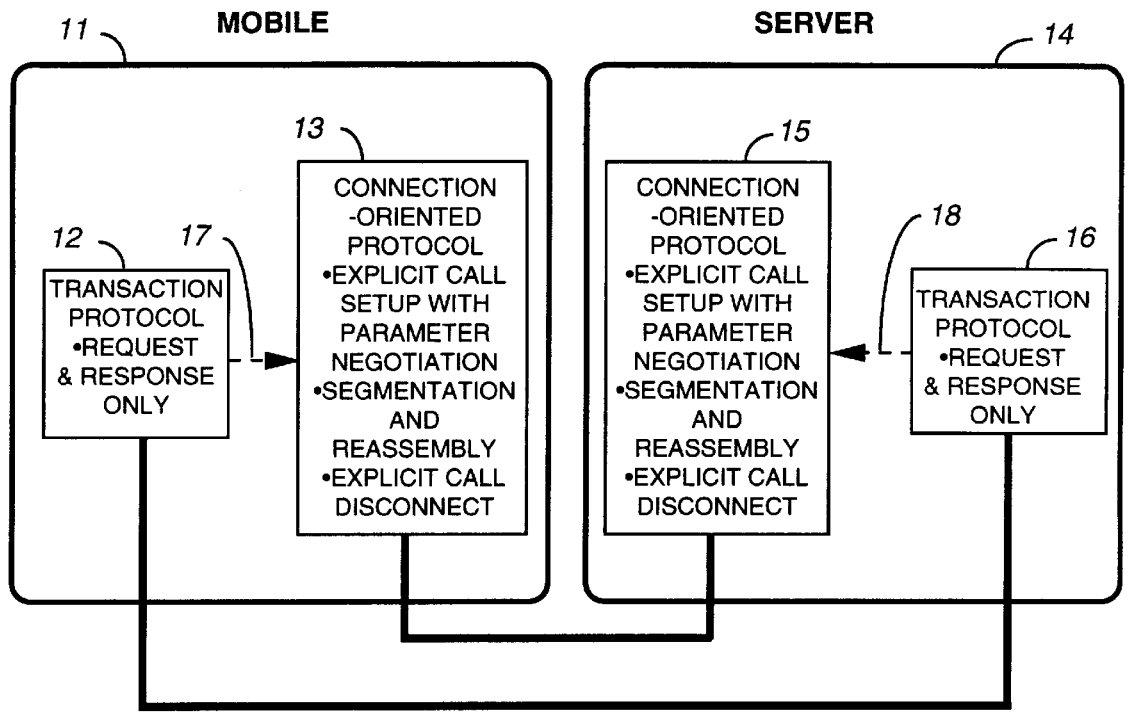
FIG. 1
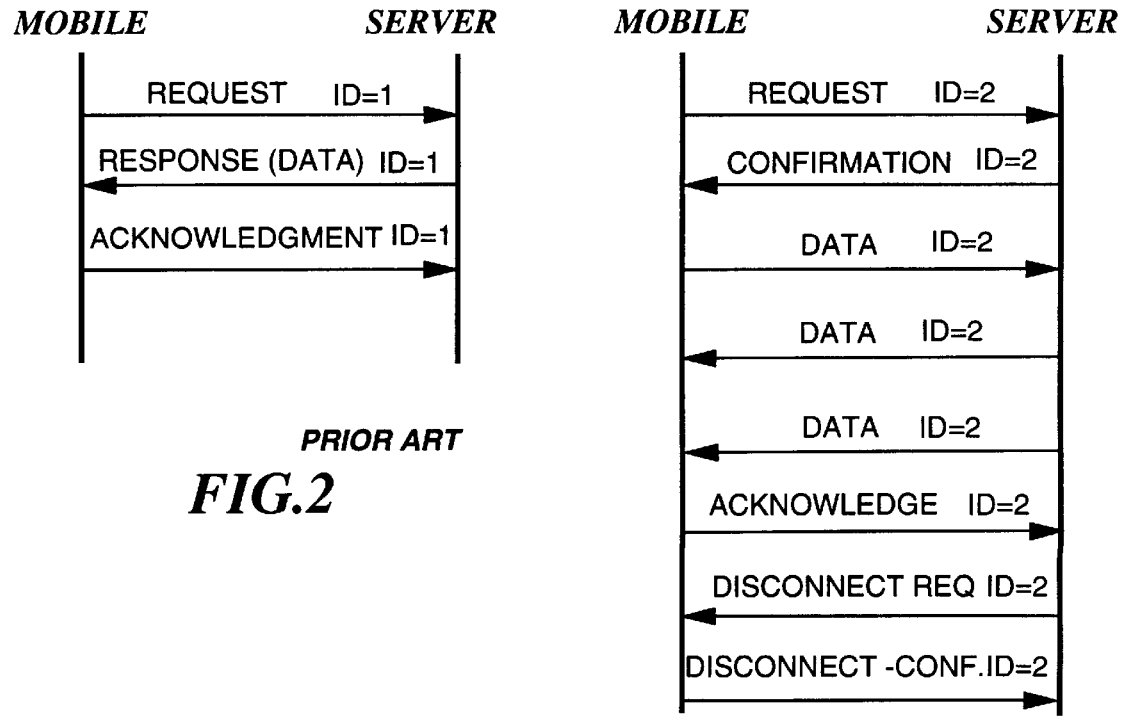
PRIOR ART
FIG. 2
PRIOR ART
FIG. 3

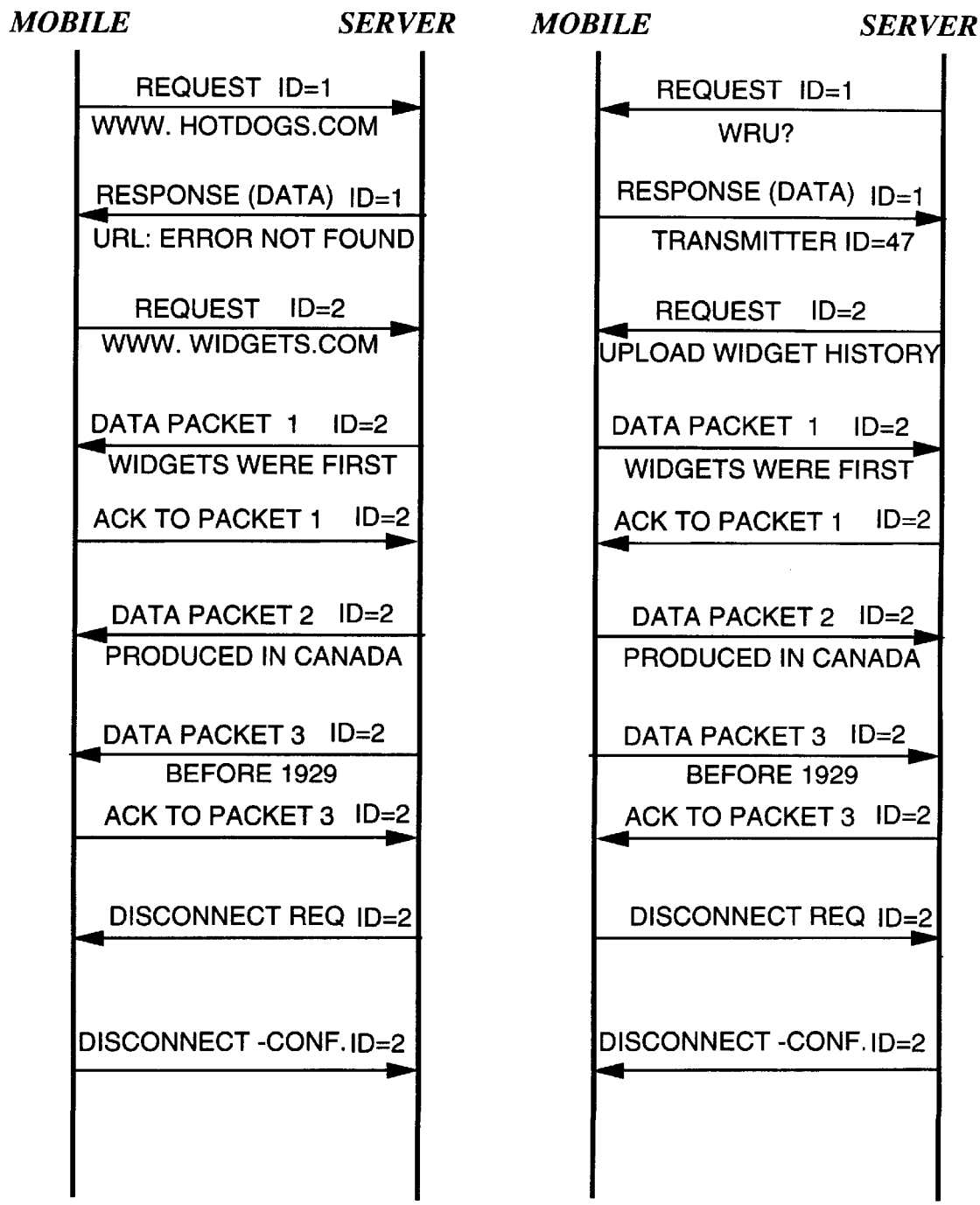

WIRELESS PROTOCOL METHOD AND APPARATUS SUPPORTING TRANSACTION REQUESTS WITH VARIABLE LENGTH RESPONSES

FIELD OF THE INVENTION

The present invention is directed to a wireless communication protocol device, and more particularly to a communication protocol and device capable of efficiently handling both transaction data exchange and connection-oriented data exchange.

BACKGROUND OF THE INVENTION

In an environment where the normal interaction between two communicating entities only requires a short request from the initiator and a short response from the receiver, a simple and efficient protocol mechanism can be designed to provide the carriage for such messages. The problem with many new environments, such as the Internet/World Wide Web is that a simple short request for information can result in a long response being returned (in essence, a response of variable size). It is difficult to design carriage protocols which operate efficiently in environments where the size of the response message is not known or determinable apriori by the request initiator. Protocols available in the public domain such as X.25 and TCP are designed around either a maximum size limit for a short request and response exchange (as shown in FIG. 2) or around a long lived connection where the protocol can accommodate any size request or response message exchange (as shown in FIG. 3). This later mechanism requires the use of a segmentation and reassembly protocol where the long message is segmented into smaller fixed size packets, usually of up to the maximum transfer unit (MTU) size for transmission, and an inverse reassembly function at the receiving side. Thus, a need exists for a protocol that efficiently handles both transaction type communications (short request and short response) as well as connection-oriented communications in a wireless environment. This protocol would preferably be optimized for transaction type messaging and could also handle long message responses as typically found in World Wide Web browsing activity.

BRIEF DESCRIPTION OF THE DRAWINGS

FIG. 1 is a block diagram of a communication system in accordance with the present invention.

FIG. 2 is a timing diagram of a system illustrating a transaction data exchange.

FIG. 3 is a timing diagram of a system illustrating a connection-oriented data exchange.

FIG. 4 is a timing diagram of a system illustrating a data exchange protocol in accordance with the present invention.

FIG. 5 is another timing diagram of a system illustrating a data exchange protocol in accordance with the present invention.

DETAILED DESCRIPTION

Figure 6:
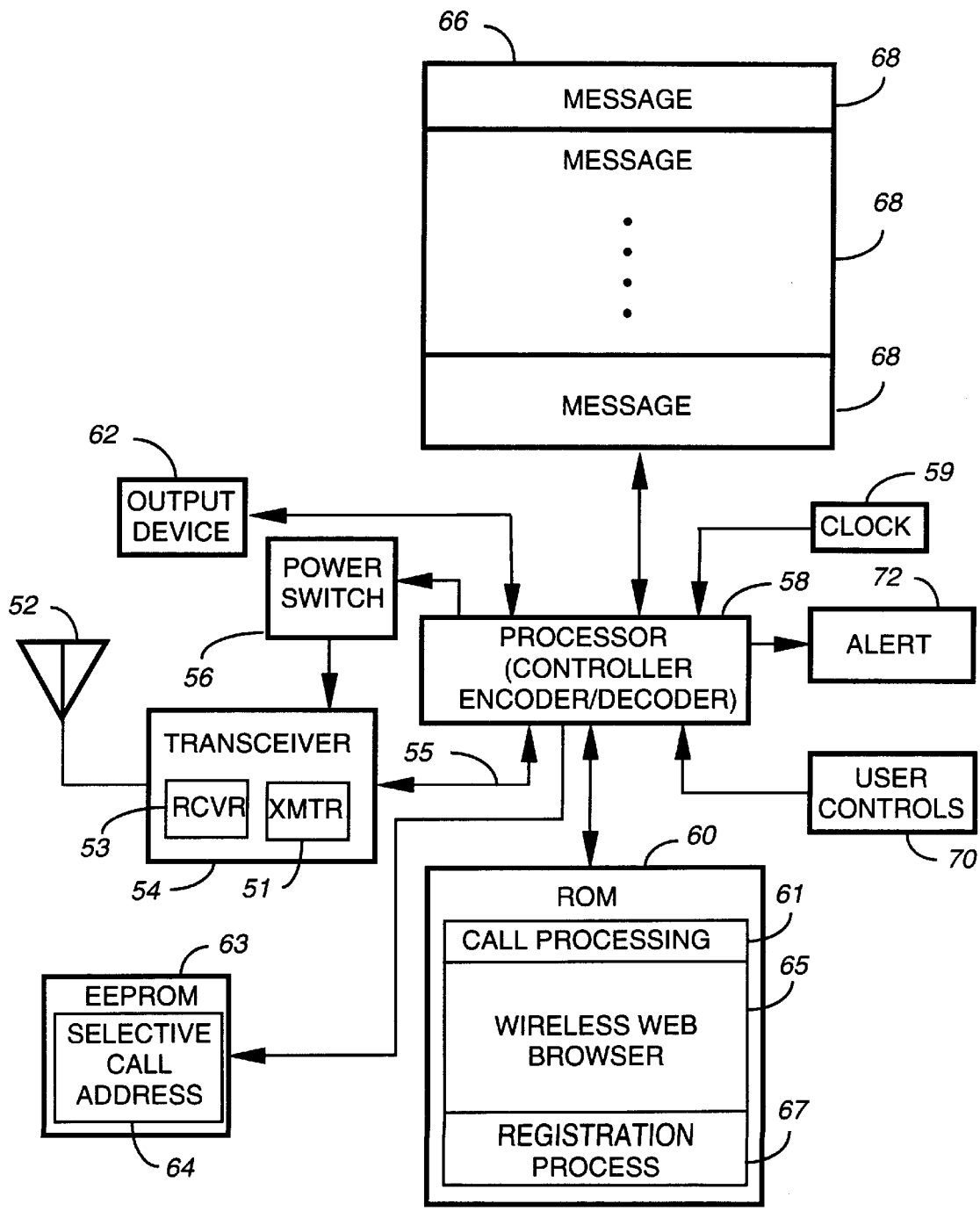
FIG. 6 is a block diagram of a selective call device in accordance with the present invention.

The present invention presents a method of linking two protocols operating at the network or transport layer. The first protocol is a transaction protocol which would be used for the efficient carriage of data over a wireless network when the size of the request message and response message are normally smaller than a maximum transfer unit (MTU) size of the wireless bearer service (MAC layer). The second protocol is a full connection-oriented protocol designed for maintaining a persistent connection between two entities for the purpose of exchanging larger amounts of data.

What distinguishes a transaction protocol from a connection-oriented protocol is the duration of the connection between the two communicating parties, the amount of information exchanged, and the complexity of the protocol. In addition, a transaction protocol has an implied semantic stating that the originator of its request does not intend to send anymore information to the recipient apart from what is contained in the initial request. Therefore, only a response from the recipient is required to satisfy the request. A transaction is a short request for information made by an initiator and a response to the request from the recipient. The lifetime of the connection between the two parties is the length of time a single message can be transmitted in each direction to complete the request/response cycle. Since there is no call setup phase as with a connection oriented protocol, there is no opportunity for each side of a transaction protocol to negotiate parameters such as packet size, and timer values. Therefore, a transaction protocol operates or is based on a apriori established set of default values. In this way the connection negotiation is eliminated from the transaction protocol. A typical example would be a bar code scanner in a grocery store transmitting the bar code to the inventory computer which responds with the item name and current price. A transaction protocol would be designed around a maximum amount of data being allowed to be transmitted in each message exchange and limit the message to one in each direction. Given these restrictions a data protocol designed to support transactions can be very simple, and thus has a low implementation and operating cost. Such a protocol would be suitable for mobile devices which have limited processing power and memory.

A connection-oriented protocol can always be used to carry a transaction message exchange, but this is not an optimal choice in terms of protocol overheads and processing requirements. For mobile devices, issues of protocol overheads and processing power are more acute than for landline devices. The use of a connection-oriented protocol represents a significant cost for a mobile device which could be reduced if a transaction protocol could be used. For a mobile device which is data enabled for Web browsing, the most efficient protocol would be a transaction protocol, but as is stated above, such a protocol would not always provide the mechanisms to carry a response. An ideal solution would be to use the transaction protocol in the case where it is sufficient to carry the request and response messages and a connection-oriented protocol in all other cases.

The present invention could be embodied in a mobile device that currently implements a transaction protocol and a connection-oriented protocol. It also assumes the peer to the mobile device, preferably a server, will also have the same protocol stack available. FIG. 1 illustrates a communication system 10 having a mobile device 11 and a server 14 to which it connects containing both a transaction protocol (12 and 16 in the mobile device and server respectively) and a connection-oriented protocol (13 and 15 in the mobile device and server respectively). Current embodiments of protocols such as a transaction protocol and connection-oriented protocol are done as separate protocol machines where the logic present in one machine is not accessible by another machine even when those machines exist on the same device. As will be described below, a transaction protocol contains features specific to optimal transmission of a request/response exchange. A connection-oriented protocol contains features specific to a persistent long lived connection over which a large amount of data may be exchanged optimally. This invention utilizes the capabilities of the connection-oriented protocol only when necessary to convey data from mobile to server and server to mobile. The invention does this by initially assuming that a request for data from a mobile or server (or from the server to the mobile as will be shown in FIG. 5) can be sufficiently and optimally handled using the transaction protocol. Only when the protocol machine has enough information relating to the amount of data to be transmitted will it invoke (as shown by items 17 and 18) the functions of the connection-oriented protocol. This invocation may take place at either the request side of the transaction or the response side of the transaction and is based on the size of data to be transmitted relative to the MTU size of the underlying bearer. The present invention differentiates itself from current embodiments of protocol machines by linking the features (logic) present in one protocol to those of another protocol and doing so when the type of transmission will benefit from such a linkage.

The transaction protocol, in its simplest form consists of three protocol data units (PDUs). A TRANSACTION-REQUEST packet, a TRANSACTION-RESPONSE packet and an ACKNOWLEDGMENT packet. See FIG. 2 for an example of the semantics of these packets. A connection-oriented protocol consists of CONNECTION-REQUEST, CONNECTION-CONFIRM, DATA. ACKNOWLEDGMENT, DISCONNECT-REQUEST and DISCONNECT-CONFIRM packets. See FIG. 3 for an example of normal usage of these packets. Both the transaction protocol and the connection-oriented protocol can share the connection identification logic present in each protocol. The ID referred in FIGS. 2 and 3 is the unique identifier which allows packets to be mapped to the correct destination within a communicating device. These ID's are necessary to allow for multiple simultaneous connections and/or transactions to be open at a single communicating device.

When a mobile device initiates a request for information, providing that request can be transmitted in a single MTU, the mobile will always use the transaction protocol. If the response is greater than the MTU size the responder will preferably segment the response and send the segments as DATA packets as shown in FIG. 4, beginning where the DATA packet sequence number equals 1. The initiator (the mobile subscriber unit) upon receipt of the DATA packet will recognize that more data is to be transmitted than can be contained in a single TRANSACTION-RESPONSE packet and will then begin to execute the connection-oriented protocol at the point where the data transfer would begin. Since all the connection management information for a transaction protocol and a connection-oriented protocol is identical, that information does not need to be re-negotiated. Upon conclusion of the last data transmission and acknowledgement both sides of the connection will be immediately closed with a DISCONNECT-REQUEST from the responder (server) and a DISCONNECT-CONFIRM from the initiator (mobile). FIG. 4 illustrates the transaction described above.

The description of FIG. 4 above assumes that a mobile device or a portable subscriber is the initiator of a wireless request, but the present invention further contemplates that a network based-server can also initiate a wireless request as shown in FIG. 5. When a server initiates a request for information, providing that request can be transmitted in a single MTU, the server will preferably use the transaction protocol. If the response is greater than the MTU size the responder will preferably segment the response and send the segments as DATA packets as shown in FIG. 5, beginning where the DATA packet sequence number equals 1. The initiator (the server in this instance) upon receipt of the DATA packet will recognize that more data is to be transmitted than can be contained in a single TRANSACTION-RESPONSE packet and will then begin to execute the connection-oriented protocol at the point where the data transfer would begin. Since all the connection management information for a transaction protocol and a connection-oriented protocol is identical, that information does not need to be re-negotiated. Upon conclusion of the last data transmission and acknowledgement both sides of the connection will be immediately closed with a DISCONNECT-REQUEST from the responder (mobile) and a DISCONNECT-CONFIRM from the initiator (server).

If an end-node (a server more likely than a mobile) can anticipate a lengthy data exchange and/or anticipate when protocol parameters must be worked out dynamically, then a connection-oriented data transfer is generally preferred. The connection-oriented protocol also allows for selective control of data flow by a user, enabling a requester to modify the data flow rate appropriately in accordance with the current resource availability and status. Another benefit of switching to the connection-oriented protocol is that once the connection has been established, the requester can then make new requests within the context of the connection. Thus, even with the efficiency of the present invention, there are several instances where a connection-oriented protocol is preferred over the initial default transaction protocol.

Referring to FIG. 6, an electrical block diagram depicts a communication device 50 such as a selective call transceiver or portable subscriber unit (PSU) in accordance with the present invention. The portable subscriber unit comprises a transceiver antenna 52 for transmitting and intercepting radio signals to and from base stations (not shown). The radio signals linked to the transceiver antenna 52 are coupled to a transceiver 54 comprising a conventional transmitter 51 and receiver 53. The radio signals received from the base stations preferably use conventional two and four-level FSK modulation, but other modulation schemes could be used as well. It will be appreciated by one of ordinary skill in the art that the transceiver antenna 52 is not limited to a single antenna for transmitting and receiving radio signals. Separate antennas for receiving and transmitting radio signals would also be suitable.

Radio signals received by the transceiver 54 produce demodulated information at the output. The demodulated information is transferred over a signal information bus 55 which is preferably coupled to the input of a processor 58, which processes the information in a manner well known in the art. Similarly, response messages including acknowledge response messages are processed by the processor 58 and delivered through the signal information bus 55 to the transceiver 54. The response messages transmitted by the transceiver 54 are preferably modulated using four-level FSK operating at a bit rate of ninety-six-hundred bps. It will be appreciated that, alternatively, other bit rates and other types of modulation can be used as well.

A conventional power switch 56, coupled to the processor 58, is used to control the supply of power to the transceiver 54, thereby providing a battery saving function. A clock 59 is coupled to the processor 58 to provide a timing signal used to time various events as required in accordance with the present invention. The processor 58 also is preferably coupled to a electrically erasable programmable read only memory (EEPROM) 63 which comprises at least one selective call address 64 assigned to the portable subscriber unit 18 and used to implement the selective call feature. The processor 58 also is coupled to a random access memory (RAM) 66 for storing the at least a message in a plurality of message storage locations 68. Of course, other information could be stored that would be useful in a two-way messaging system such as zone identifiers and general purpose counters to preferably count calls (to and from the PSU).

The communication device 50 in the form of a two-way messaging unit may also comprise a transmitter coupled to a encoder and further coupled to the processor 58. It should be understood that the processor 58 in the present invention could serve as both the decoder and encoder.

When an address is received by the processor 58, the call processing element 61 preferably within a ROM 60 compares the received address with at least one selective call addresses 64, and when a match is detected, a call alerting signal is preferably generated to alert a user that a message has been received. The call alerting signal is directed to a conventional audible or tactile alert device 72 coupled to the processor 58 for generating an audible or tactile call alerting signal. In addition, the call processing element 61 processes the message which preferably is received in a digitized conventional manner, and then stores the message in the message storage location 68 in the RAM 66. The message can be accessed by the user through conventional user controls 70 coupled to the processor 58, for providing functions such as reading, locking, and deleting a message. Alternatively, messages could be read through a serial port (not shown). For retrieving or reading a message, an output device 62, e.g., a conventional liquid crystal display (LCD). preferably also is coupled to the processor 58. It will be appreciated that other types of memory. e.g., EEPROM, can be utilized as well for the ROM 60 or RAM 66 and that other types of output devices, e.g., a speaker, can be utilized in place of or in addition to the LCD, particularly in the case of receipt of digitized voice. The ROM 60 also preferably includes elements for handling the registration process (67) and for web browsing (65) among other elements or programs.

Again referring to FIG. 6, a communication device 50 that is coupled to a widely distributed information source such as the internet and capable of retrieving information therefrom preferably comprises a transceiver 54 a decoder and an encoder (58) coupled to the transceiver for respectively decoding messages received and encoding messages transmitted by the communication device, and a processor (58). The processor is preferably programmed to initiate a wireless request to a server (or receive a wireless request from a server) using a transaction protocol and then to continue communications using the transaction protocol if a response from the server (or from the communication device 50) is less than a maximum transfer unit size and else subsequently communicate using a connection oriented protocol upon determining that the response from the server (or from the communication device 50) is greater than the maximum transfer unit size by detecting receipt of data packets of a segmented response from the server (or from the communication device 50). The processor may be further programmed to initiate the wireless request only if the size of the wireless request is smaller than the maximum transfer unit size or additionally programmed to segment the wireless request into data packets when the wireless request exceeds the maximum transfer unit size. In such an event, the processor maybe further programmed to initiate the wireless request as a connection oriented protocol when the wireless request exceeds the maximum transfer unit size.

Figure 7:
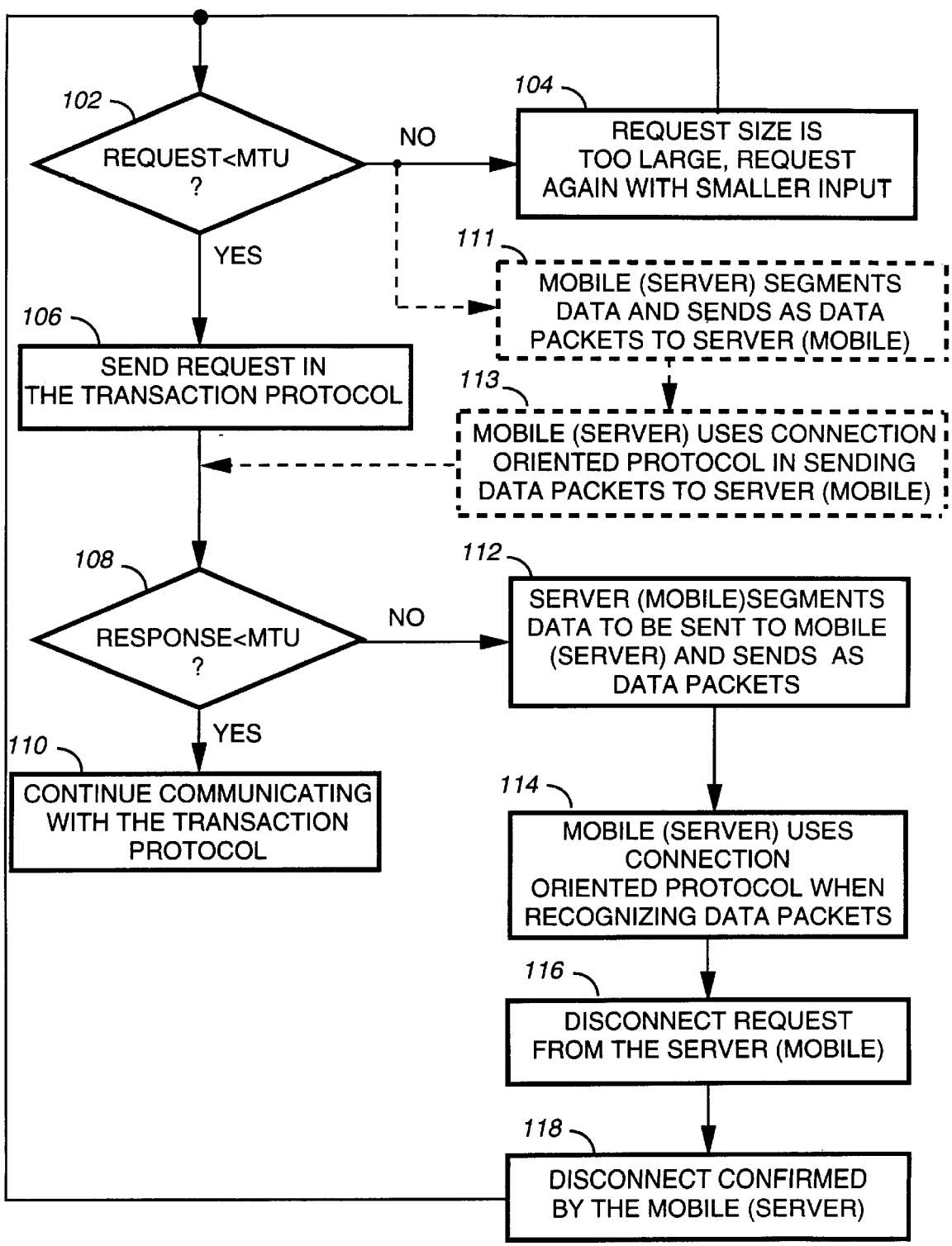
FIG. 7 is a flow chart illustrating a hybrid method for data exchange in accordance with the present invention.

Referring to FIG. 7, a flow chart illustrates a method 100 of communicating using a hybrid of a transaction protocol and a connection oriented protocol. The method 100 preferably begins by determining at decision block 102 whether a wireless request from a portable subscriber is smaller than a maximum transfer unit. In one embodiment, if the wireless request is too large as indicated at block 104, then the method returns to start again and awaits a wireless request that is smaller than a maximum transfer unit. In an alternative embodiment, the wireless request proceeds at block 111 by segmenting the wireless request into data packets when the wireless request exceeds the maximum transfer unit size. In this alternative embodiment, then the mobile or portable subscriber unit proceeds as a connection oriented protocol in sending data packets to a server when the wireless request exceeds the maximum transfer unit size as shown in block 113. Then, the method would proceed as described below with respect to blocks 112–118, particularly if the response from the server is larger than the maximum transfer unit size.

If the wireless request is smaller than the maximum transfer unit size at decision block 102, then the wireless request from a portable subscriber to the server is initiated using a transaction protocol at step 106. At decision block 108, if the response from the server is smaller than the maximum transfer unit size, then the method 100 continues communications using the transaction protocol at block 110. If the response from the server is larger than the maximum transfer unit size at decision block 108, then the server would segment the data into data packets to be sent to the mobile at block 112. The portable subscriber unit and server would then communicate using the connection oriented protocol at block 114 upon the server recognizing the segmented data packets. When all data packets from the server are sent, then the server transmits a disconnect request at block 116. The mobile or portable subscriber unit responds to the server by sending a disconnect confirm at block 118. Then, the method starts again when a subsequent wireless request is made from the portable subscriber.

The flow chart of FIG. 7 can likewise describe the situation where a server initiates a wireless request to a mobile or a portable subscriber. The response from the portable subscriber can either be small enough (less than a MTU) for continuing a transaction protocol communication or too long (greater than a MTU), justifying a transfer to the connection-oriented protocol. Merely interchanging "MOBILE" with "SERVER" in the flow chart of FIG. 7 and in the description in the paragraph above would adequately describe the method 100 where the server is initiating a wireless request and the portable subscriber (or mobile) is providing a response.

What is claimed is:

1. A method of communicating using a hybrid of a transaction protocol and a connection oriented protocol, comprising the steps of:

initiating a wireless request from either a portable subscriber to a server or from the server to the portable subscriber using the transaction protocol;

continuing communications using the transaction protocol if a response from either the server or the portable subscriber is less than a maximum transfer unit size; and segmenting the response into data packets if the response from the server or portable subscriber is greater than the maximum transfer unit size, wherein the portable subscriber unit and server subsequently communicate using the connection oriented protocol until a subsequent wireless request is made from either the portable subscriber or server.

2. The method of claim 1, wherein the step of initiating the wireless request proceeds only if the size of the wireless request is smaller than the maximum transfer unit size.

3. The method of claim 1, wherein the step of initiating the wireless request proceeds by segmenting the wireless request into data packets when the wireless request exceeds the maximum transfer unit size.

4. The method of claim 3, wherein the step of initiating the wireless request proceeds as a connection oriented protocol when the wireless request exceeds the maximum transfer unit size.

5. The method of claim 1, wherein the method uses the connection oriented protocol when an end node anticipates a lengthy data exchange rather than initiating the wireless request using the transaction protocol.

6. The method of claim 1, wherein the method overrides using the transaction protocol initially and uses the connection oriented protocol when protocol parameters must be dynamically selected.

7. A method of communicating using a hybrid of a transaction protocol and a connection oriented protocol, comprising the steps at a portable subscriber of:

initiating a wireless request to a server or receiving a wireless request from a server using the transaction protocol;

continuing communications using the transaction protocol if a response from the server or the portable subscriber is less than a maximum transfer unit size; and subsequently communicating using the connection oriented protocol upon determining that the response from the server or the portable subscriber is greater than the maximum transfer unit size by detecting receipt of data packets of a segmented response from the server or the portable subscriber.

8. The method of claim 7, wherein the step of initiating the wireless request proceeds only if the size of the wireless request is smaller than the maximum transfer unit size.

9. The method of claim 7, wherein the step of initiating the wireless request proceeds by segmenting the wireless request into data packets when the wireless request exceeds the maximum transfer unit size.

10. The method of claim 9, wherein the step of initiating the wireless request proceeds as a connection oriented protocol when the wireless request exceeds the maximum transfer unit size.

11. A method of communicating using a hybrid of a transaction protocol and a connection oriented protocol, comprising the steps at a server of:

receiving a wireless request from a portable subscriber unit or initiating a wireless request to the portable subscriber unit using the transaction protocol;

continuing communications using the transaction protocol if a response from the server or the portable subscriber unit is less than a maximum transfer unit size;

segmenting the response into data packets if the response is greater than the maximum transfer unit size; and subsequently communicating using the connection oriented protocol when the response is greater than the maximum transfer unit size until a subsequent wireless request is received from the portable subscriber unit to the server or is received from the server to the portable subscriber unit.

12. The method of claim 11, wherein the step of receiving the wireless request proceeds only if the size of the wireless request is smaller than the maximum transfer unit size.

13. The method of claim 11, wherein the step of receiving the wireless request proceeds as a connection oriented protocol when the server detects that the wireless request exceeds the maximum transfer unit size by detecting the wireless request in the form of segmented data packets.

14. A communication device wirelessly coupled to a widely distributed information source and capable of retrieving information therefrom, comprising:

a receiver a decoder coupled to the receiver for decoding messages received at the communication device;

a transmitter coupled to the decoder;

a memory coupled to the decoder for storing information; and a processor programmed to:

initiate a wireless request to a server or receive a wireless request from the server using a transaction protocol;

continue communications using the transaction protocol if a response from the server or from the communication device is less than a maximum transfer unit size; and subsequently communicate using a connection oriented protocol upon determining that the response from the server or communication device is greater than the maximum transfer unit size by detecting receipt of data packets of a segmented response from the server.

15. The communication device of claim 14, wherein the communication device comprises a selective call transceiver.

16. The communication device of claim 14, wherein processor is further programmed to initiate the wireless request proceeds only if the size of the wireless request is smaller than the maximum transfer unit size.

17. The communication device of claim 14, wherein processor is further programmed to segment the wireless request into data packets when the wireless request exceeds the maximum transfer unit size.

18. The communication device of claim 14, wherein the processor is further programmed to initiate the wireless request as a connection oriented protocol when the wireless request exceeds the maximum transfer unit size.

* * * * *